May 6, 1924.

G. C. GOODE

CONSTRUCTION FOR TAKING UP END THRUST

Filed Nov. 9, 1921

1,492,684

Inventor:
Gilbert C. Goode
by
Thurston Kwis & Hudson
attys

Patented May 6, 1924.

1,492,684

UNITED STATES PATENT OFFICE.

GILBERT C. GOODE, OF CLEVELAND, OHIO, ASSIGNOR TO THE WHITE MOTOR COMPANY, OF CLEVELAND, OHIO, A CORPORATION OF OHIO.

CONSTRUCTION FOR TAKING UP END THRUST.

Application filed November 9, 1921. Serial No. 513,923.

*To all whom it may concern:*

Be it known that I, GILBERT C. GOODE, a citizen of the United States, residing at Cleveland, in the county of Cuyahoga and State of Ohio, have invented a certain new and useful Improvement in Construction for Taking Up End Thrust, of which the following is a full, clear, and exact description.

The present invention relates to a construction for taking up the end thrust of a shaft with respect to a bearing for the shaft.

More specifically, the invention as shown and described, is applied to taking up the end thrust of the crank shaft for an engine, with respect to one of the end bearings therefor.

Figure 1:
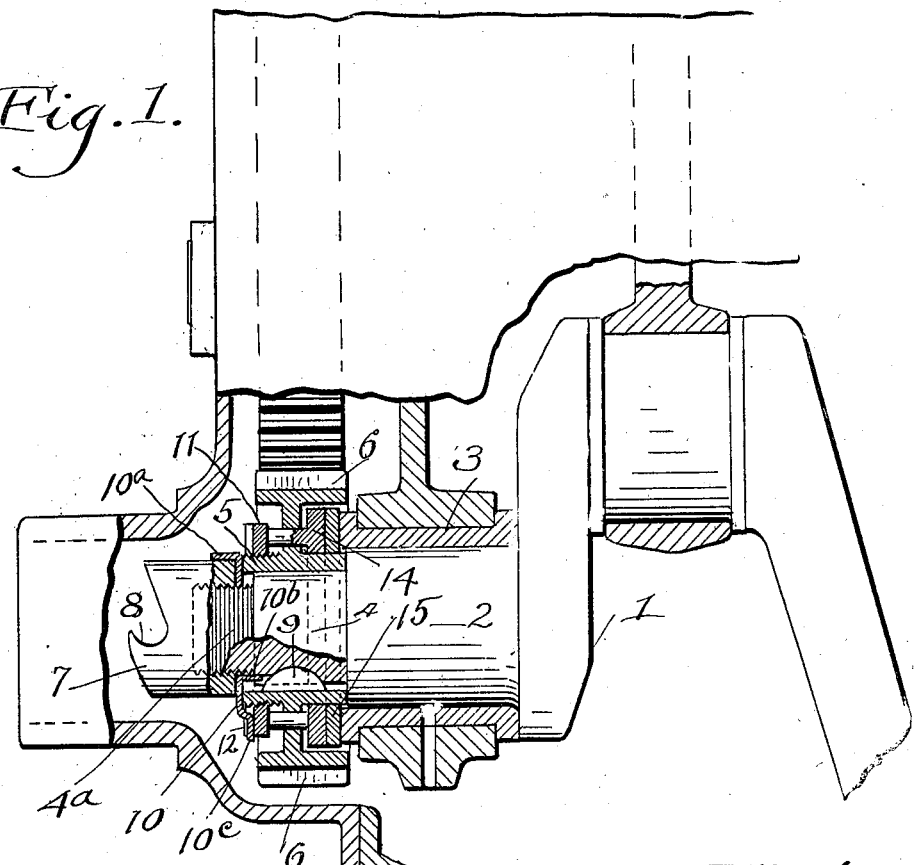
Figure 2:
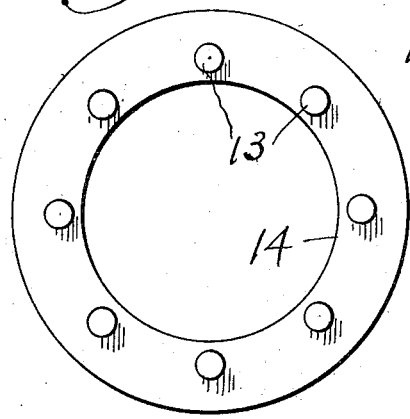
Figures 3, 4:
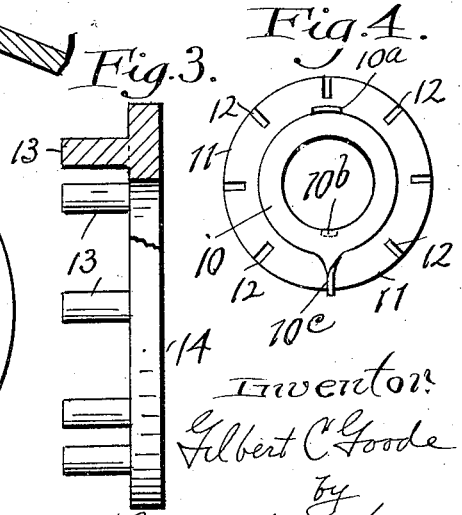

Reference should be had to the accompanying drawings forming a part of this specification, in which Fig. 1 is an elevation with portions in section of a portion of an engine construction embodying the invention; Fig. 2 is an elevation of a portion of the construction; Fig. 3 is a side elevation with portions in section of the construction of the part shown in Fig. 2.

Fig. 4 is a plan view of the threaded thrust disk and the locking disk associated therewith.

Referring to the drawings, 1 indicates a crank shaft having a bearing portion 2 which extends through a bearing proper which is indicated at 3.

In the present instance the shaft has a reduced shoulder portion 4 which receives the hub 5 of a gear 6 which gear 6 may be utilized to drive any moving part of the engine, as for instance, a cooling fan, timing gears, cam shaft or any other moving part.

The end of the crank shaft is threaded as indicated at 4$^a$ and receives on the end thereof a member 7 which is provided with suitable jaws 8 for receiving a crank handle by which the crank shaft may be turned over, as in the starting of the engine.

The hub 5 of the gear is suitably connected to the shoulder portion 4, as by means of a key 9.

Between the outer end of the hub 5 and the inner portion of the member 7 which is threaded on the end of the crank shaft, there is a disk-like member 10, this disk-like member being provided with a central opening by which it passes over the threaded portion 4$^a$. In order to prevent relative rotation between the disk 10 and the parts with which it is associated, this disk is turned down over a portion of the member 7 as indicated at 10$^a$ and is also provided with an inwardly extending finger 10$^b$ which extends within the slot in the crank shaft with which the key 9 cooperates. The disk 10 has an extension 10$^c$ which bears against the outer surface of a plate 11 and upon the outer surface of this plate 11 are a plurality of serrations such as indicated at 12, and the extension 10$^c$ is adapted to co-operate with any one of the several serrations 12. The plate has a central opening which is threaded and it engages with the outer threaded surface of the hub 5 of the gear 6. The plate 11 bears against pins 13 which are carried by or formed integral with a plate 14. The pins 13 extend through suitable holes formed in the web of the gear 6.

The plate 14 bears against a wearing disk 15 which in turn lies against the outer end of the bearing 3 in which the end of the crank shaft is mounted.

It will be obvious that when the member 11 is turned upon the threaded portion of the hub of the gear 6 it will push inwardly upon the pins 13 and the plate 14 and this inward push will communicate through the wear plate against the bearing 3.

Inasmuch as the gear 6 is rigidly mounted upon the end of the crank shaft, it will readily be seen that the manipulation of the plate 11 may take up any end thrust which the crank shaft 1 may have with respect to the bearing 3.

While the description which has been given relates precisely to the construction shown in the drawing, it will be understood that in such constructions as do not employ such a gear as the gear 6, the member 11 may be directly mounted adjacent the end of the crank shaft and that the other elements 14 and 15 may be mounted directly upon the crank shaft instead of by the hub of the gear and all this may be done without in any way departing from the substance of the invention which has been described.

Having described my invention, I claim:—

1. The combination with a shaft and a bearing therefor, said shaft extending beyond the bearing, of means for taking up end thrust between the shaft and its bearing comprising an annular member surrounding the said shaft and lying beyond the bearing, said member being provided with outwardly projecting pins, and a second annular member co-operating with said pins and having longitudinal adjustment with respect to the shaft.

2. The combination with a shaft and a bearing therefor, said shaft extending beyond the bearing, of means for taking up end thrust between the shaft and its bearing comprising a wear plate member surrounding the shaft and contacting with the end of the bearing, an annular member surrounding the shaft and engaging with said wear plate, said member being provided with outwardly projecting pins, and a second annular member co-operating with the pins and having longitudinal adjustment with respect to the shaft thereby to move the member with the pins and the wear plate toward said bearing.

3. The combination with a shaft and a bearing therefor, said shaft extending beyond the bearing, a member having a hub secured to said shaft outside the bearing, an annular member surrounding the shaft and having threaded engagement with the said hub, a second annular member having outwardly extending pins, said second annular member lying adjacent an end of said bearing and said pins being engaged by the threaded annular member.

4. The combination with a shaft and a bearing therefor, said shaft extending beyond the hearing, a hub member secured to said shaft beyond the bearing, an annular member surrounding the shaft and having threaded engagement with the outer end of said hub, a second annular member having pins extending from the outer surface thereof, said second annular member lying adjacent an end of said bearing and said pins being engaged by the threaded annular member, a spring arm member fixedly carried by said shaft, said spring arm member engaging with serrations in the first mentioned annular member to prevent relative rotation thereof.

5. The combination of a shaft with a bearing therefor, said shaft extending beyond the bearing, a hub fixedly mounted upon said shaft beyond the bearing therefor, a web portion carried by said hub, an annular member surrounding the hub and provided with pins, said pins extending through openings in said web portion, a second annular member which has a threaded mounting on the hub, said second annular member bearing against the said pins.

6. The combination with a shaft with a bearing therefor, said shaft extending beyond said bearing, a hub fixedly mounted on the shaft beyond the bearing, a web extending from said hub, an annular member mounted upon the hub and adjacent the bearing, said annular member having pins which extend through suitable openings in the said hub portion, a second annular member having a threaded mounting on the said hub and contacting with the said pins, a spring detent member fixedly mounted on the said shaft and adapted to engage serrations in the said second annular member to hold the same in position.

In testimony whereof, I hereunto affix my signature.

GILBERT C. GOODE.